United States Patent
Segal

(10) Patent No.: US 6,753,859 B1
(45) Date of Patent: Jun. 22, 2004

(54) METHOD AND SYSTEM FOR HYBRID RADIOSITY

(75) Inventor: Peter Segal, Exton, PA (US)

(73) Assignee: Bentley Systems, Inc., Exton, PA (US)

(*) Notice: Subject to any disclaimer, the term of this patent is extended or adjusted under 35 U.S.C. 154(b) by 0 days.

(21) Appl. No.: 09/671,734

(22) Filed: Sep. 29, 2000

(51) Int. Cl.⁷ .................................................. G06T 15/00
(52) U.S. Cl. ..................................................... 345/426
(58) Field of Search ............................... 345/419, 426, 345/427, 428

(56) References Cited

U.S. PATENT DOCUMENTS

| | | | | |
|---|---|---|---|---|
| 5,313,568 A | * | 5/1994 | Wallace et al. | 345/426 |
| 5,488,700 A | * | 1/1996 | Glassner | 345/426 |
| 5,870,098 A | * | 2/1999 | Gardiner | 345/426 |
| 6,396,495 B1 | * | 5/2002 | Parghi et al. | 345/426 |
| 6,441,820 B2 | * | 8/2002 | Prater | 345/426 |

* cited by examiner

*Primary Examiner*—Phu K. Nguyen
(74) *Attorney, Agent, or Firm*—Hale and Dorr LLP

(57) ABSTRACT

A method and system for determining lighting in a scene to be measured or displayed on a graphics display, utilizing hybrid radiosity. Radiosity is determined from a light source to a radiosity object(s) in the scene, including determining an amount of illumination received for the object. The amount of received illumination for the object(s) is substantially zeroed out, and the amount of light that needs to be shot from the object's surface is retained. Direct illumination is determined, and added to the light which is to be shot. The direct illumination is determined utilizing ray tracing.

15 Claims, 7 Drawing Sheets

METHOD AND SYSTEM FOR HYBRID RADIOSITY

BACKGROUND OF THE INVENTION

1. Field of the Invention

The invention generally relates to use of radiosity for obtaining more accurate illumination of scenes for measurement and graphics displays. This will improve shadow boundaries in displayed images. More specifically, the invention relates to using radiosity for indirect lighting and using a ray trace for direct lighting.

2. Description of the Related Art

Current radiosity solutions require an excessive amount of memory in order to obtain accurate lighting and acceptable shadow boundaries. This is because surfaces have to be subdivided extremely finely to get good results. In addition to excessive memory usage, these fine subdivisions require a substantial amount of vertices to be tested, necessitating significant additional computation time per radiosity shot.

One of the most common problems typically encountered with radiosity has been that in order to get decent looking shadows one needed to have very small element areas (or high levels of element subdivision). This, of course, greatly increases the processing time required.

Often the shadows cast by indirect illumination or bounced light are far less significant than those from the original light sources.

Traditionally, radiosity shadows look blocky, as shown in FIGS. 1–2, illustrating a conventional overview and a closeup of jagged shadows. This appearance can be avoided if the shadows are heavily meshed, as shown in FIG. 3, illustrating a closeup of jagged shadows after increased meshing. Unfortunately, obtaining an acceptable shadow utilizing radiosity can require a large amount of processing time.

On the other hand, ray traced shadows look very crisp, however, ray tracing alone does not account for indirect lighting. In scenes where indirect lighting is important, such as a floor lamp in a room, ray tracing is insufficient.

Thus, there remains a need for a system and method to provide acceptably crisp shadows for both direct and indirect illumination, requiring little processing capacity.

BRIEF SUMMARY OF THE INVENTION

The invention provides for computing the radiosity solutions using a reduced degree of meshing (such as fewer polygons and subdivisions), thereby resulting in lower memory requirements and faster processing times; throwing away the illumination directly associated with the lights; and then adding ray traced illumination to the scene. The illumination and shadows due to direct lighting are improved because the illumination is computed on a pixel-by-pixel basis.

According to the invention, there is provided a method and system for determining lighting in a scene to be displayed on a graphics display. Radiosity is determined from at least one light source to at least one radiosity object in the scene, including determining an amount of illumination received corresponding to the at least one object. The amount of received illumination corresponding to the at least one object is substantially zeroed out, and the amount of light that needs to be shot from at least one surface of the at least one object is retained. The light to be shot from at least one surface of at least one object is determined. Direct illumination is determined, and determined direct illumination is added to the determined light.

According to one alternative, light to be shot from at least one object is calculated.

In one embodiment, an amount of illumination received on a surface or point on the surface of at least one object is determined; and the amount of received illumination for the surface or point on the surface of at least one object is substantially zeroed out.

There may be provided multiple light sources, and multiple objects.

The invention may further include the displayed scene.

These and other objects, features and advantages of the present invention are readily apparent from the following drawings and detailed description.

BRIEF DESCRIPTION OF THE DRAWINGS

The invention is described in connection with the drawings, in which.

DETAILED DESCRIPTION OF THE PREFERRED EMBODIMENT

Figure 1:
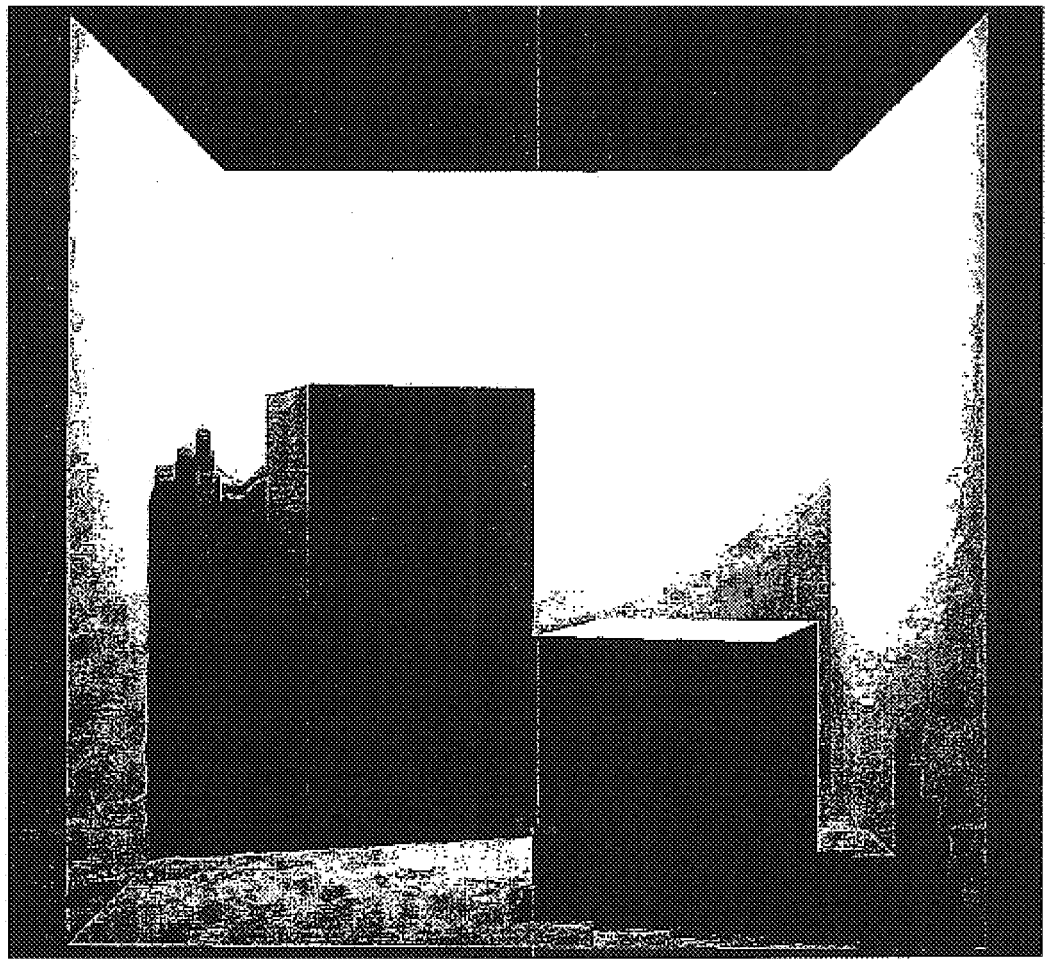
FIG. 1 is a prior art example of an overview of jagged shadows of a scene.
Figure 2:
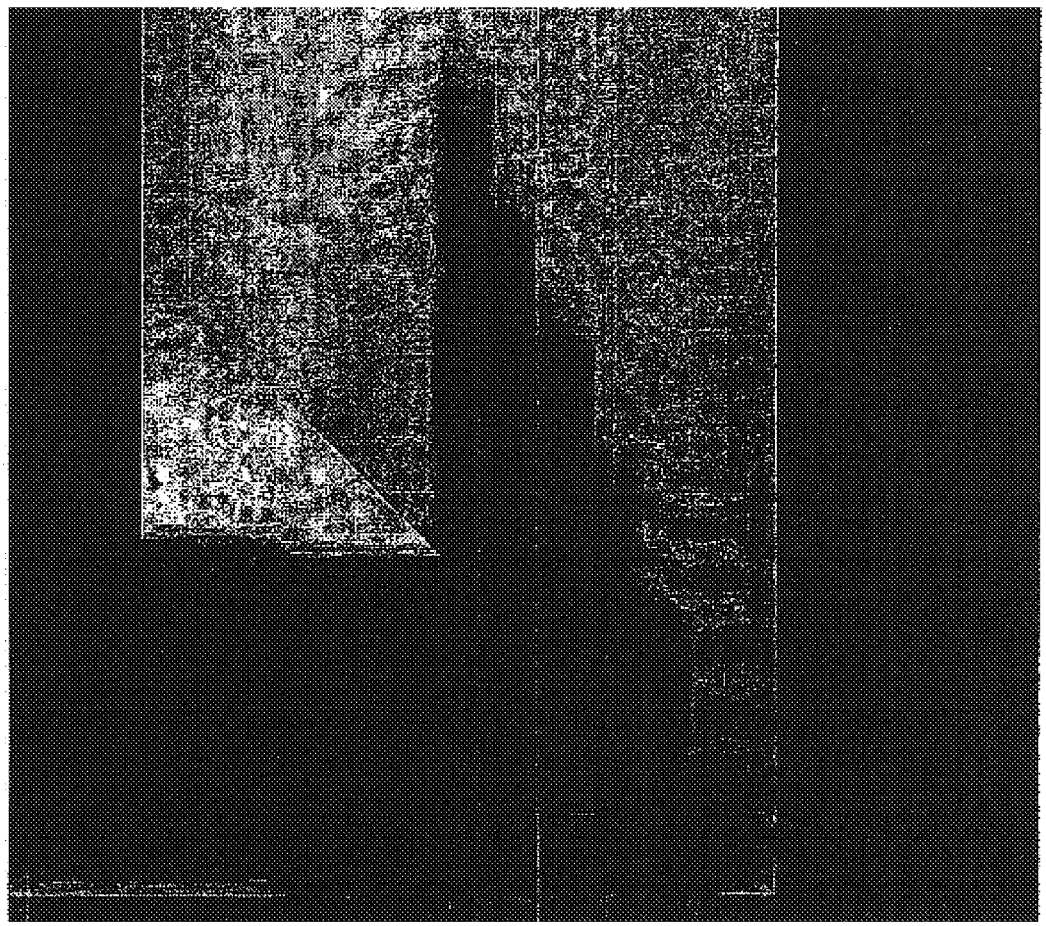
FIG. 2 is a prior art example closeup of jagged shadows of the scene of FIG. 1.
Figure 3:
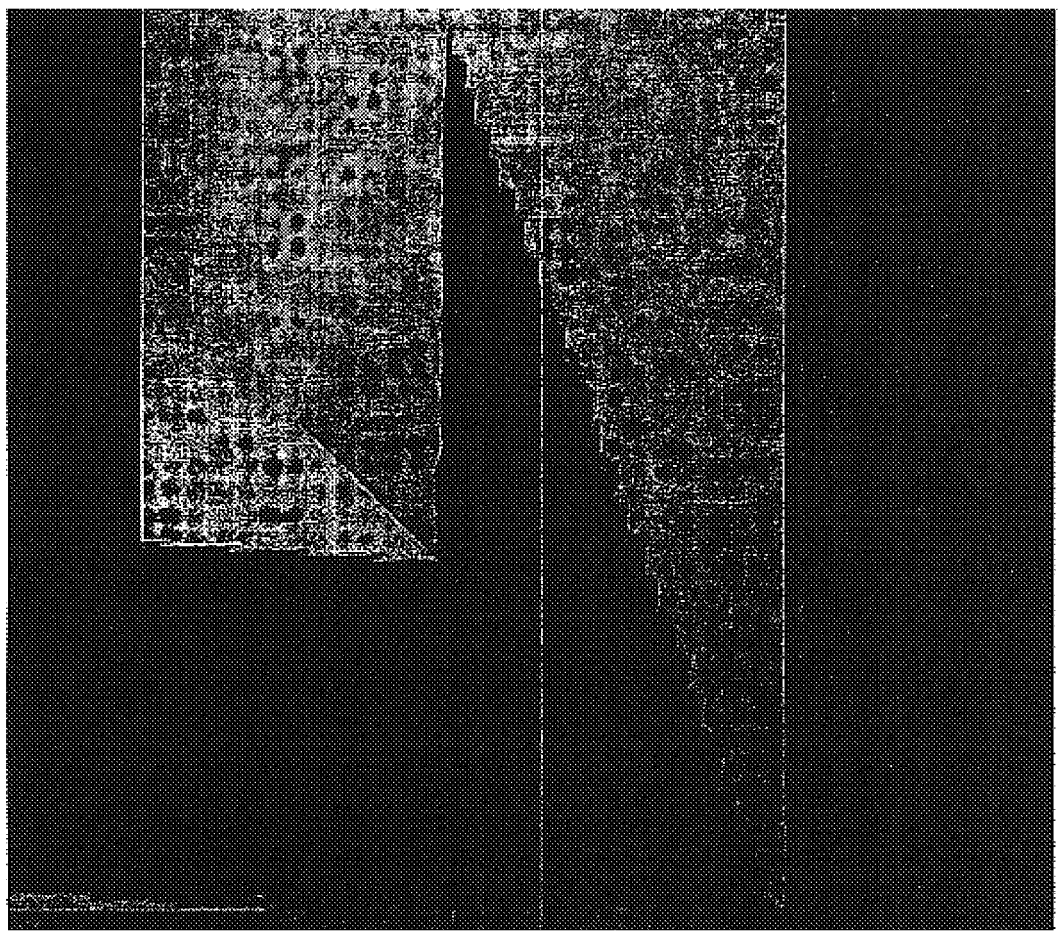
FIG. 3 is a prior art example closeup of jagged shadows of the scene of FIG. 1, after increased meshing.
Figure 4:
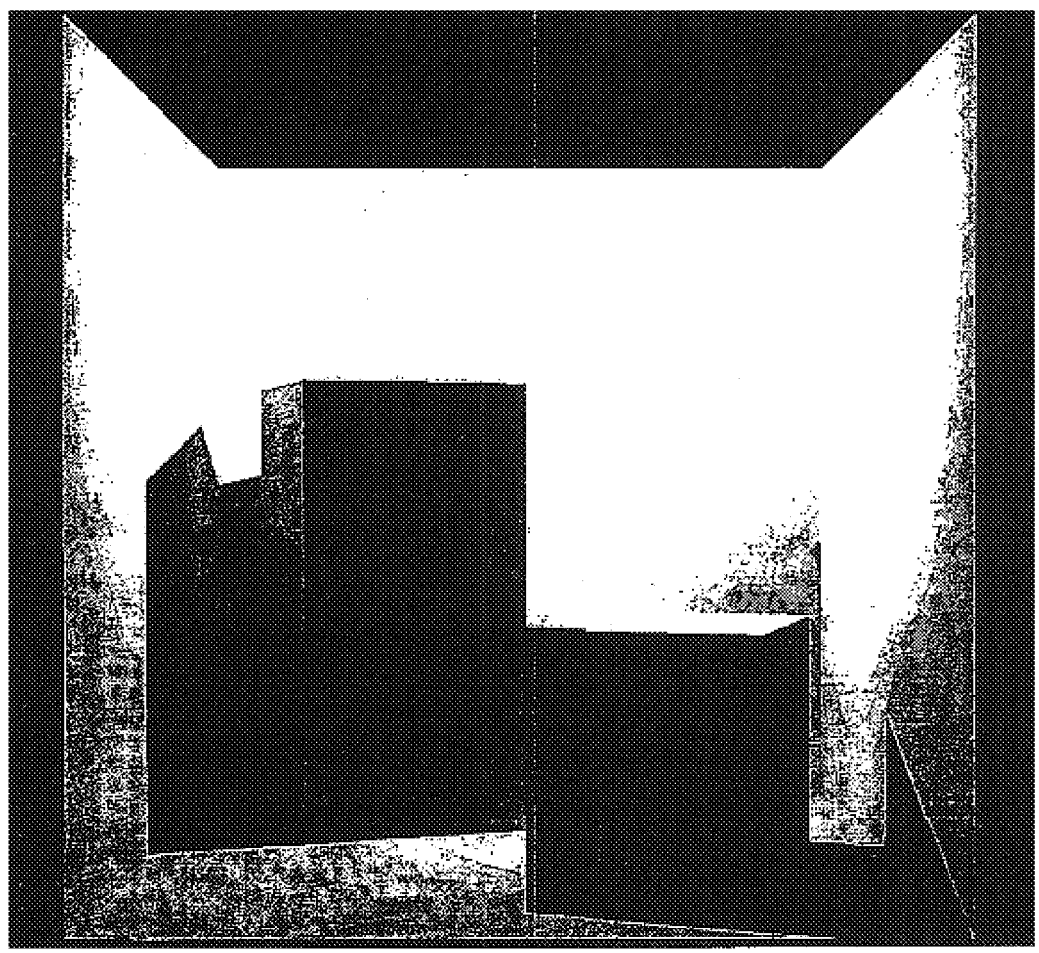
FIG. 4 is an example overview of shadows of FIG. 1, using the invention.
Figure 5:
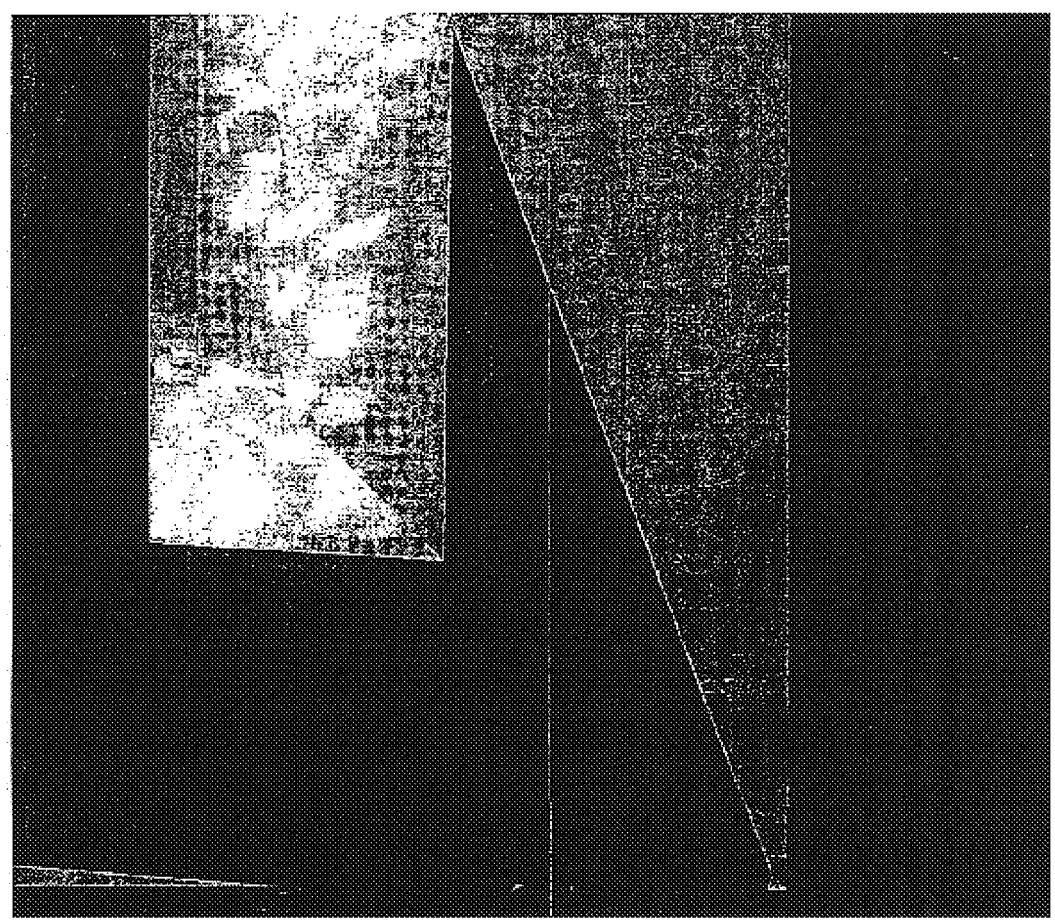
FIG. 5 is an example closeup of shadows of FIG. 1, using the invention.
Figure 6:
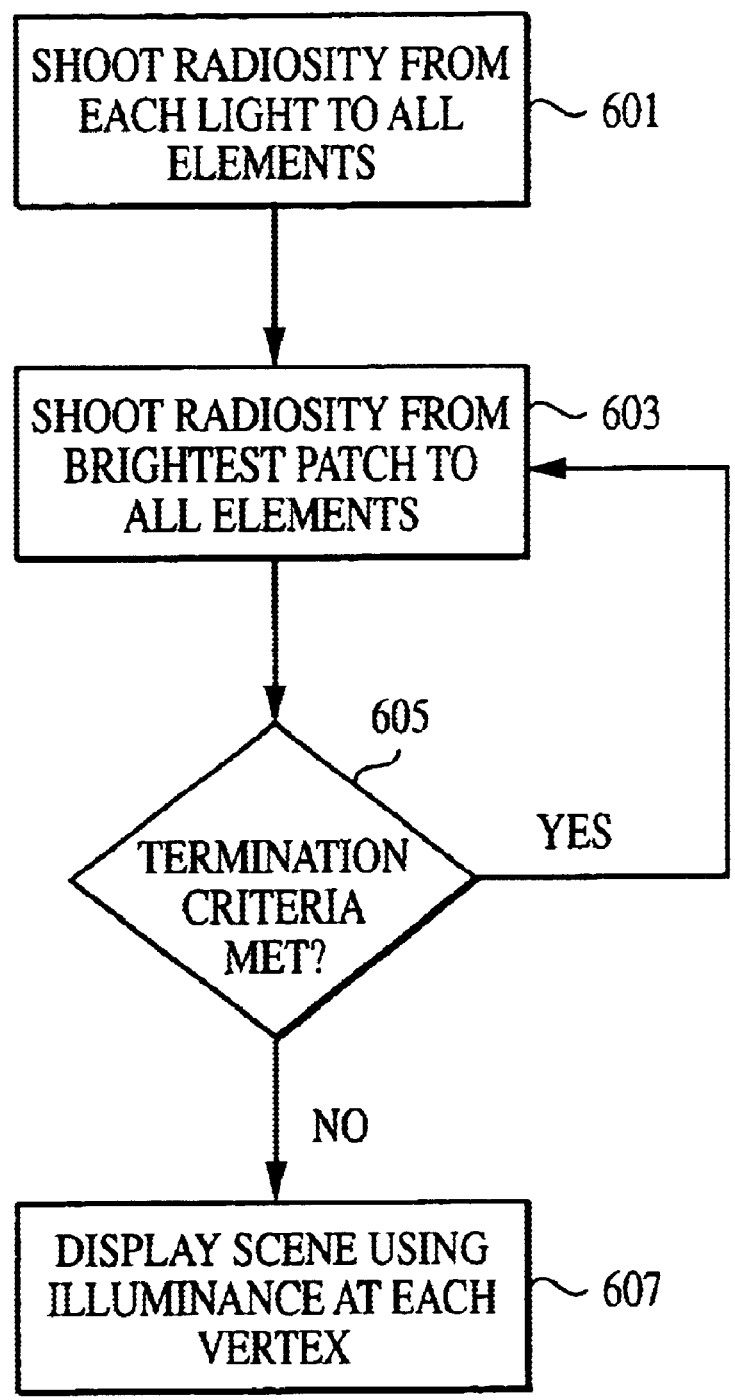
FIG. 6 is a flow chart showing conventional radiosity.

The present invention provides that shadows from light sources will be ray traced. This means that very high quality images and measurements can be obtained using much larger element sizes, and therefore much less memory is needed. FIGS. 4 and 5 illustrate these high quality shadows.

Generally, the invention provides for use of a ray tracer to compute the shadows of a radiosity solution. The radiosity solutions are computed using a reduced degree of meshing (e.g., fewer polygons and subdivisions), thereby resulting in lower memory requirements and faster processing times. The illumination directly associated with the lights is omitted. The ray traced illumination is added to the scene.

Figure 7:
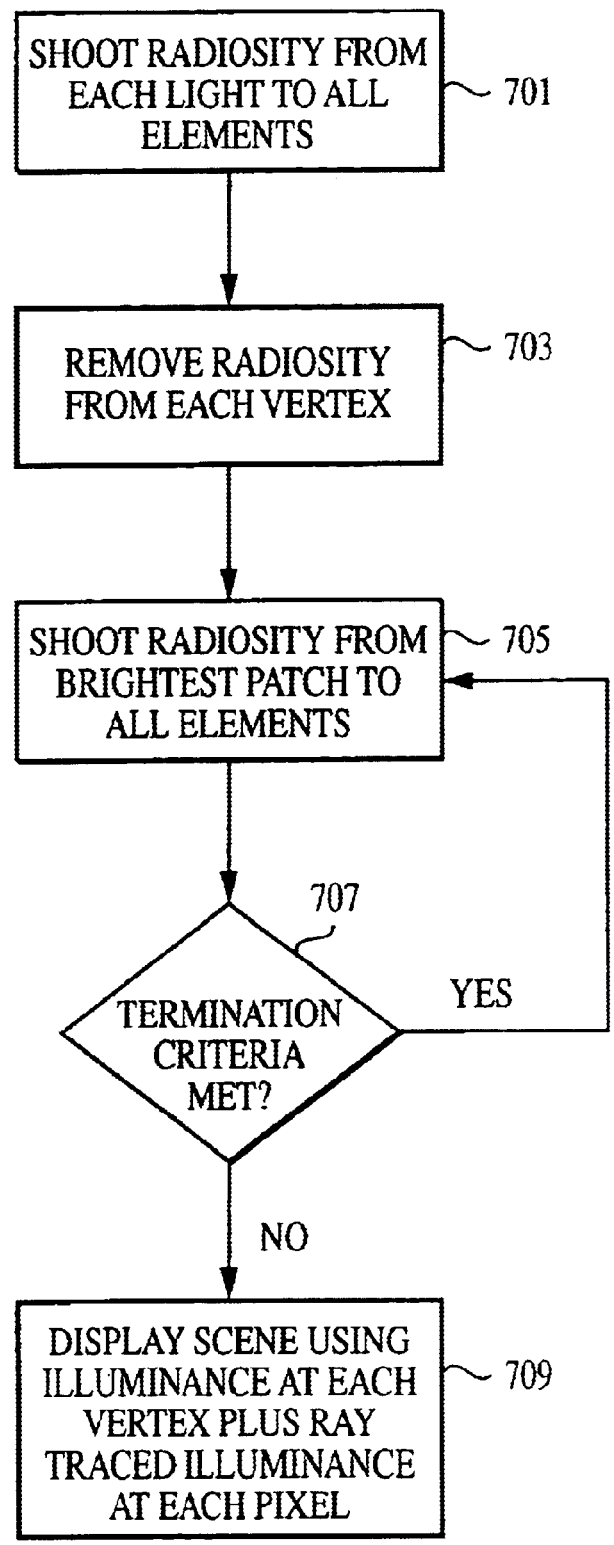
FIG. 7 is a flow chart showing hybrid radiosity according to the invention.

Reference is made to FIG. 7. When using the ray trace direct illumination of the present invention, the following occur:

1. Radiosity is shot, or at least calculated, from all lights to all radiosity objects in the scene (Step 701). Radiosity is shot from the lights to the objects according to any known method, and includes the calculation of light needed to be shot from each of the objects to provide for indirect lighting. A ray trace form factor is one appropriate radiosity method.

2. After all lights have been shot, the amount of illumination received for each surface, or point on surface (or vertex) of each object is zeroed out, and the amount of light that needs to be shot from each surface is retained (Step 703). In other words, a significant amount of the direct illumination is eliminated. Preferably, all direct illumination is eliminated. In this way, it is provided that radiosity is used for indirect lighting, but not for direct lighting. More specifically, the direct illumination for each surface or point on surface, is removed, for example, by setting to zero.

3. The light is shot from each of the surfaces of the objects, as in normal radiosity modes, until done (Steps 705, 707). This provides the shadows and lights, via radiosity, for the indirect lighting. Any of the known methods of providing radiosity may be used for this step.

4. When displaying and/or measuring the intermediate or final solution, (a) the radiosity solution can be displayed using smooth shading algorithms, however, the surfaces will be displayed using indirect lighting; or (b) alternatively, the system does a ray trace of the radiosity solution, and to each surface to be displayed, adds the indirect illumination of the surface computed by the radiosity solution to the direct illumination computed by ray tracing for a total solution (Step 709). In this way, the direct illumination is provided via ray tracing, or some similar, non-radiosity solution. Any of the known methods of ray trace is appropriate for doing the ray trace to add the direct illumination.

In summary, the directly illuminated shadows are provided via ray tracing, and have a crisp appearance; the less significant, indirectly illuminated shadows have been rapidly calculated.

As a practical matter, if the majority of light in a scene is predominantly reflected (indirect) light, such as a scene of a room with no lights and sunlight coming from a single small window, then in order to get a good solution, the user should subdivide the surfaces more than if the scene was predominately lit with direct light.

The invention is particularly useful for computation of radiosity images where the shadows from direct illumination are substantially more important than those from indirect lighting. In other words, the invention should be particularly useful for many radiosity applications.

The invention may be implemented in computer software, and preferably runs on a general purpose computer. However, it will be appreciated that the invention readily could be implemented in hardware or firmware.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for determining lighting in a scene to be measured or displayed on a graphics display, comprising the steps of:
   (A) determining radiosity from at least one light source to at least one radiosity object in the scene, including determining an amount of illumination received corresponding to the at least one object;
   (B) substantially zeroing out the amount of received illumination corresponding to the at least one object, and retaining the amount of light that needs to be shot from at least one surface of,the at least one object;
   (C) determining the light to be shot from the at least one surface of the at least one object; and
   (D) determining the direct illumination, and adding the direct illumination from step (C) as the total illumination.

2. The method of claim 1, wherein the determining step (C) includes calculating light to be shot from the at least one object.

3. The method of claim 1, wherein the direct illumination is determined utilizing a ray tracing.

4. The method of claim 1, wherein step (A) includes determining an amount of illumination received for at least one point on a surface of the at least one object; and step (B) includes substantially zeroing out the amount of received illumination for at least one point of the at least one object.

5. The method of claim 1, wherein there are provided a plurality of light sources, and a plurality of objects.

6. The method of claim 1, further comprising the step of displaying the scene on the graphics display.

7. The method of claim 1, further comprising the step of providing the total illumination as a measurement.

8. A method for determining lighting in a scene to be measured or displayed on a graphics display, comprising the steps of:
   (A) determining radiosity from at least one light source to a surface of the at least one radiosity object in the scene, including determining an amount of illumination received corresponding to the at least one object and calculating light to be shot from the at least one object;
   (B) substantially zeroing out the amount of received illumination for the vertex of the at least one object, and retaining the amount of light that needs to be shot from at least one surface of the at least one object;
   (C) determining the light to be shot from the at least one surface of the at least one object; and
   (D) determining the direct illumination utilizing ray tracing, and adding indirect illumination determined from step (C).

9. A system for determining lighting in a scene to be measured or displayed on a graphics display, comprising:
   (A) a determined radiosity from at least one light source to at least one radiosity object in the scene, including a determined amount of illumination received corresponding to the at least one object;
   (B) the determined amount of received illumination corresponding to the at least one object, substantially being zeroed out, and the amount of light that needs to be shot from at least one surface of the at least one object being retained;
   (C) a determined amount of light to be shot from the at least one surface of the at least one object; and
   (D) a determined direct illumination, added to the determined amount of light, as a total illumination from (C).

10. The system of claim 9, wherein the direct illumination is determined utilizing a ray tracing.

11. The system of claim 9, wherein the determined amount of illumination received corresponds to at least one point on a surface of the at least one object; and the substantially zeroed out amount of received illumination corresponds to at least one point of the at least one object.

12. The system of claim 9, wherein there are provided a plurality of light sources, and a plurality of objects.

13. The system of claim 9, further comprising the displayed scene.

14. The system of claim 9, further comprising returning the total illumination as a measurement.

15. A system for determining lighting in a scene to be displayed on a graphics display, comprising:
   (A) a determined radiosity from at least one light source to at least one point on a surface of the at least one radiosity object in the scene, including a determined amount of illumination received corresponding to the at least one object and light calculated to be shot from the at least one object;
   (B) a substantially zeroed out amount of received illumination corresponding to at least one point on at least one object, and a retained amount of light that needs to be shot from at least one surface of the at least one object;
   (C) a determined amount of light to be shot from the at least one surface of the at least one object; and
   (D) a determined direct illumination utilizing ray tracing, added to the determined amount of light from (C), as a total illumination.

* * * * *